(12) United States Patent
Dhuse et al.

(10) Patent No.: US 10,360,106 B2
(45) Date of Patent: Jul. 23, 2019

(54) THROTTLED REAL-TIME WRITES

(71) Applicant: International Business Machines Corporation, Armonk, NY (US)

(72) Inventors: Greg R. Dhuse, Chicago, IL (US); Wesley B. Leggette, Chicago, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 15/409,386

(22) Filed: Jan. 18, 2017

(65) Prior Publication Data

US 2017/0123920 A1 May 4, 2017

Related U.S. Application Data

(63) Continuation-in-part of application No. 13/917,017, filed on Jun. 13, 2013, now Pat. No. 9,674,155, which
(Continued)

(51) Int. Cl.
*G06F 11/10* (2006.01)
*G06F 3/06* (2006.01)
(Continued)

(52) U.S. Cl.
CPC .......... *G06F 11/1092* (2013.01); *G06F 3/064* (2013.01); *G06F 3/067* (2013.01);
(Continued)

(58) Field of Classification Search
CPC .... G06F 11/1092; G06F 3/0619; G06F 3/064; G06F 3/0659; G06F 3/067;
(Continued)

(56) References Cited

U.S. PATENT DOCUMENTS

| 4,092,732 A | 5/1978 | Ouchi |
| 5,271,012 A * | 12/1993 | Blaum ................ G06F 11/1092 |
| | | 714/6.24 |

(Continued)

FOREIGN PATENT DOCUMENTS

EP    1903750 A1    3/2008

OTHER PUBLICATIONS

Communication pursuant to Article 94(3) EPC; EP Application No. 12856963.9; dated May 26, 2017; 9 pages.
(Continued)

*Primary Examiner* — April Y Blair
*Assistant Examiner* — Dipakkumar B Gandhi
(74) *Attorney, Agent, or Firm* — Garlick & Markison; Timothy W. Markison; Shayne X. Short

(57) ABSTRACT

A computing device includes an interface configured to interface and communicate with a dispersed storage network (DSN), a memory that stores operational instructions, and a processing module operably coupled to the interface and memory such that the processing module, when operable based on the operational instructions, is configured to perform various operations. The computing device determines data access rates corresponding respectively to storage units (SUs). In certain situations, the computing device selects at least a data access threshold number of SUs excluding a first slowest SU having the first slowest data access rate to service data access request(s) for set(s) of encoded data slices (EDSs) corresponding to a data object. The computing device facilitates servicing of the data access request(s) for the set(s) of EDSs by the at least a data access threshold number of SUs that excludes the first slowest SU having the first slowest data access rate.

20 Claims, 9 Drawing Sheets

Related U.S. Application Data is a continuation-in-part of application No. 13/707,428, filed on Dec. 6, 2012, now Pat. No. 9,298,548.

(60) Provisional application No. 61/679,007, filed on Aug. 2, 2012, provisional application No. 61/569,387, filed on Dec. 12, 2011.

(51) Int. Cl.
*H04L 29/08* (2006.01)
*H04L 29/06* (2006.01)
*H03M 13/37* (2006.01)
*G06F 11/30* (2006.01)
*H03M 13/15* (2006.01)

(52) U.S. Cl.
CPC .......... *G06F 3/0619* (2013.01); *G06F 3/0659* (2013.01); *G06F 11/1076* (2013.01); *H03M 13/3761* (2013.01); *H04L 63/0428* (2013.01); *H04L 67/10* (2013.01); *H04L 67/1097* (2013.01); *G06F 2211/1028* (2013.01); *H03M 13/1515* (2013.01); *H04L 2463/061* (2013.01)

(58) Field of Classification Search
CPC .......... G06F 11/1076; G06F 2211/1028; H04L 63/0428; H04L 67/10; H04L 67/1097; H04L 2463/061; H03M 13/3761; H03M 13/1515
See application file for complete search history.

(56) References Cited

U.S. PATENT DOCUMENTS

| | | | |
|---|---|---|---|
| 5,351,246 A * | 9/1994 | Blaum | G06F 11/1092 714/6.21 |
| 5,454,101 A | 9/1995 | Mackay et al. | |
| 5,485,474 A | 1/1996 | Rabin | |
| 5,522,031 A * | 5/1996 | Ellis | G06F 11/1092 714/6.22 |
| 5,774,643 A | 6/1998 | Lubbers et al. | |
| 5,802,264 A * | 9/1998 | Chen | G06F 11/1084 714/6.12 |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,490,353 B1 | 12/2002 | Tan | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 7,752,389 B1 * | 7/2010 | Fan | G06F 11/1092 711/114 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0163507 A1 | 8/2003 | Chang | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0011425 A1 * | 1/2007 | Sicola | G06F 3/0605 711/165 |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0177415 A1 * | 8/2007 | Shau | G06F 13/4243 365/50 |
| 2007/0204028 A1 * | 8/2007 | Lee | G06F 3/0613 709/223 |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2008/0212776 A1 | 9/2008 | Motoyama | |
| 2009/0041244 A1 | 2/2009 | Lee et al. | |
| 2009/0094251 A1 | 4/2009 | Gladwin et al. | |
| 2009/0094318 A1 | 4/2009 | Gladwin et al. | |
| 2009/0217385 A1 | 8/2009 | Teow et al. | |
| 2010/0023524 A1 | 1/2010 | Gladwin et al. | |
| 2010/0268877 A1 | 10/2010 | Resch et al. | |
| 2011/0071988 A1 | 3/2011 | Resch | |
| 2011/0138192 A1 | 6/2011 | Kocher et al. | |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

(56) References Cited

OTHER PUBLICATIONS

Zeilenga; Lightweight Directory Access Protocol (LDAP): Internationalized String Preparation; IETF Network Working Group; RFC 4518; Jun. 2006; pp. 1-14.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
International Business Machines; Response to EP communication dated May 26, 2017; dated Nov. 1, 2017; 5 pgs.

* cited by examiner

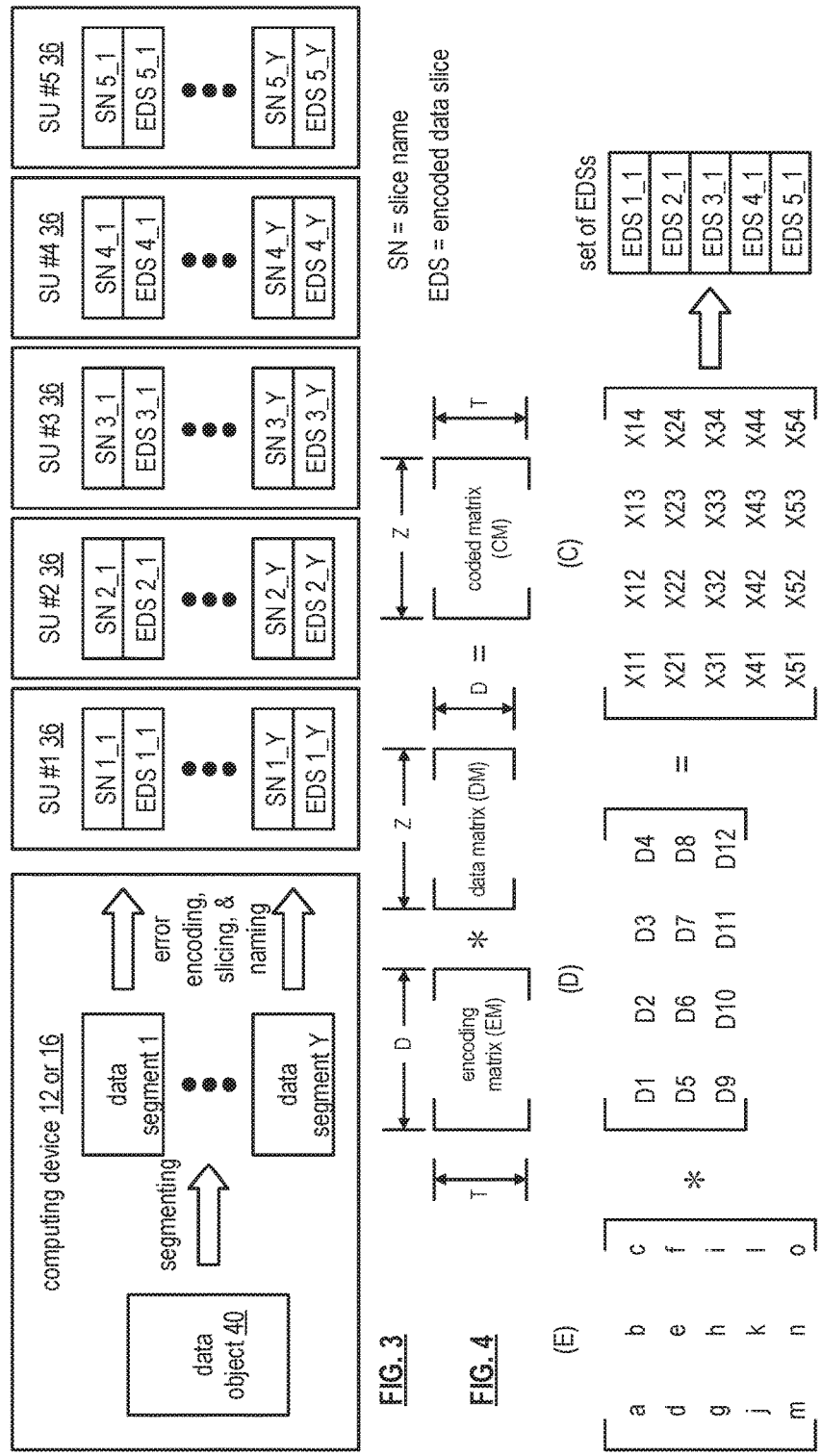

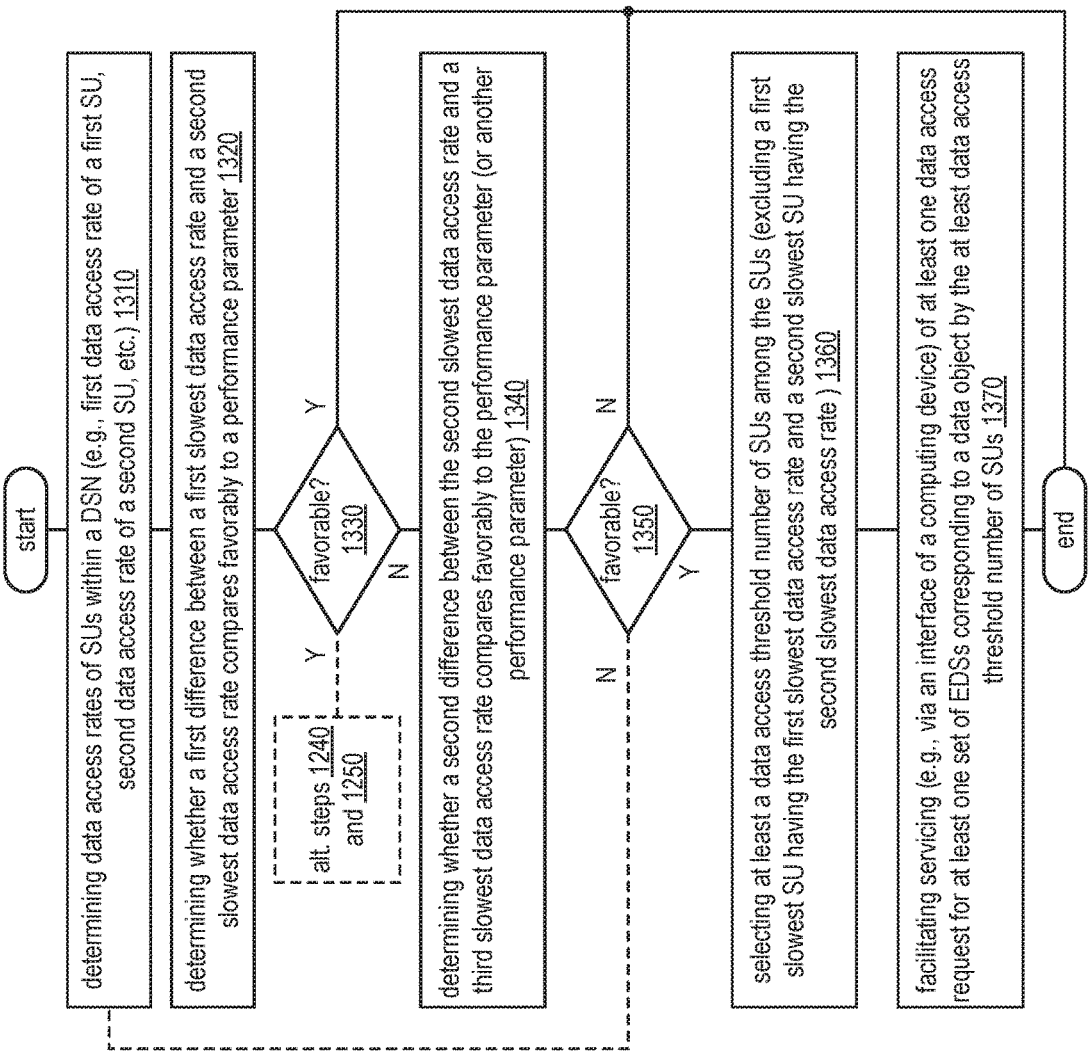

THROTTLED REAL-TIME WRITES

CROSS REFERENCE TO RELATED PATENTS

The present U.S. Utility Patent Application claims priority pursuant to 35 U. S.C. § 120, as a continuation-in-part (CIP) of U.S. Utility patent application Ser. No. 13/917,017, entitled "ENCRYPTING SEGMENTED DATA IN A DISTRIBUTED COMPUTING SYSTEM," filed Jun. 13, 2013, pending, which claims priority pursuant to 35 U.S.C. § 119(e) to U.S. Provisional Application No. 61/679,007, entitled "TASK PROCESSING IN A DISTRIBUTED STORAGE AND TASK NETWORK," filed Aug. 2, 2012, expired. The U.S. Utility patent application Ser. No. 13/917,017 also claims priority pursuant to 35 U.S.C. § 120, as a continuation-in-part (CIP) of U.S. Utility patent application Ser. No. 13/707,428, entitled "DISTRIBUTED COMPUTING IN A DISTRIBUTED STORAGE AND TASK NETWORK," filed Dec. 6, 2012, now issued as U.S. Pat. No. 9,298,548 on Mar. 29, 2016, which claims priority pursuant to 35 U.S.C. § 119(e) to U.S. Provisional Application No. 61/569,387, entitled "DISTRIBUTED STORAGE AND TASK PROCESSING," filed Dec. 12, 2011, expired. All of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Within data storage systems, various devices therein may operate at different speeds for various reasons. The prior art does not provide adequate solutions by which acceptably improved or optimal operation of such data storage systems. There continues to be room for improvement in the operation of such data storage systems.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 13 is a diagram illustrating another embodiment of a method for execution by one or more computing devices in accordance with the present invention.

DETAILED DESCRIPTION OF THE INVENTION

Figure 1:
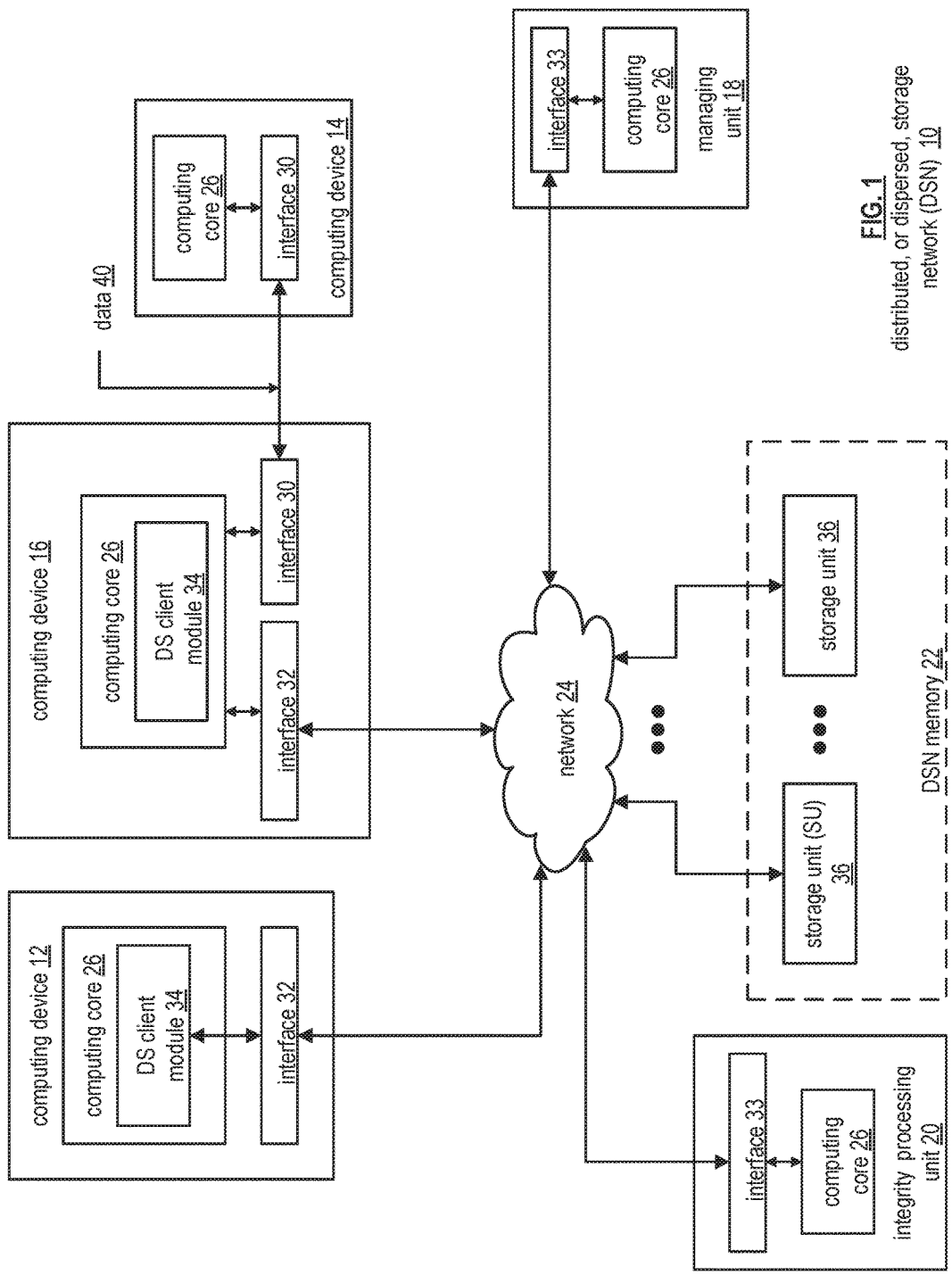
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
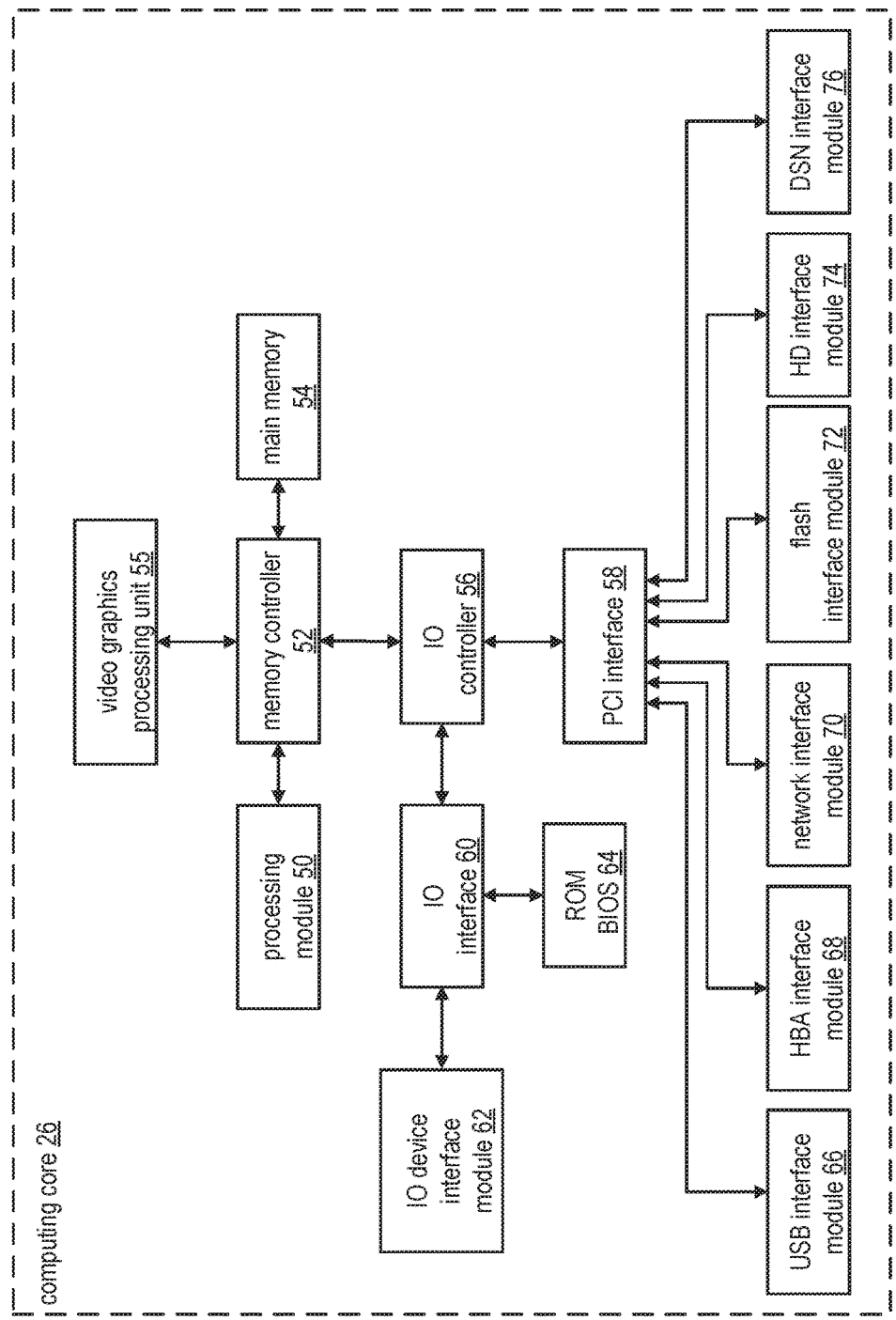
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the 10 device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
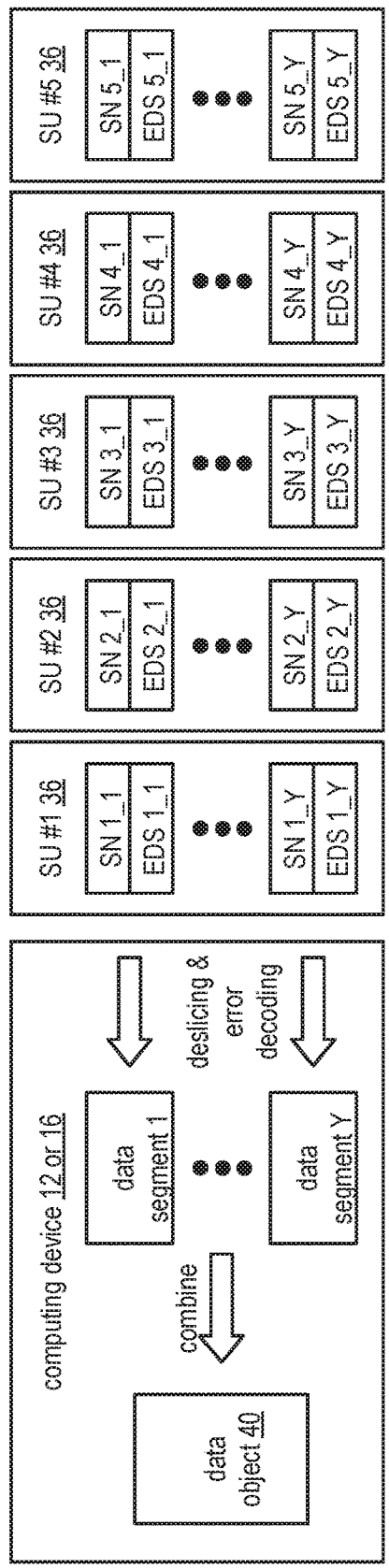
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) includes storage unit (SU) module that includes a plurality of storage units (SUs) such as SUs 36 (e.g., that may alternatively referred to a DSN module that includes a plurality of distributed storage and/or task (DST) execution units 36 (e.g., storage units (SUs), computing devices, etc.) that may be located at geographically different sites (e.g., one in Chicago, one in Milwaukee, etc.). Each of the SUs (e.g., DST execution units) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Figure 9:
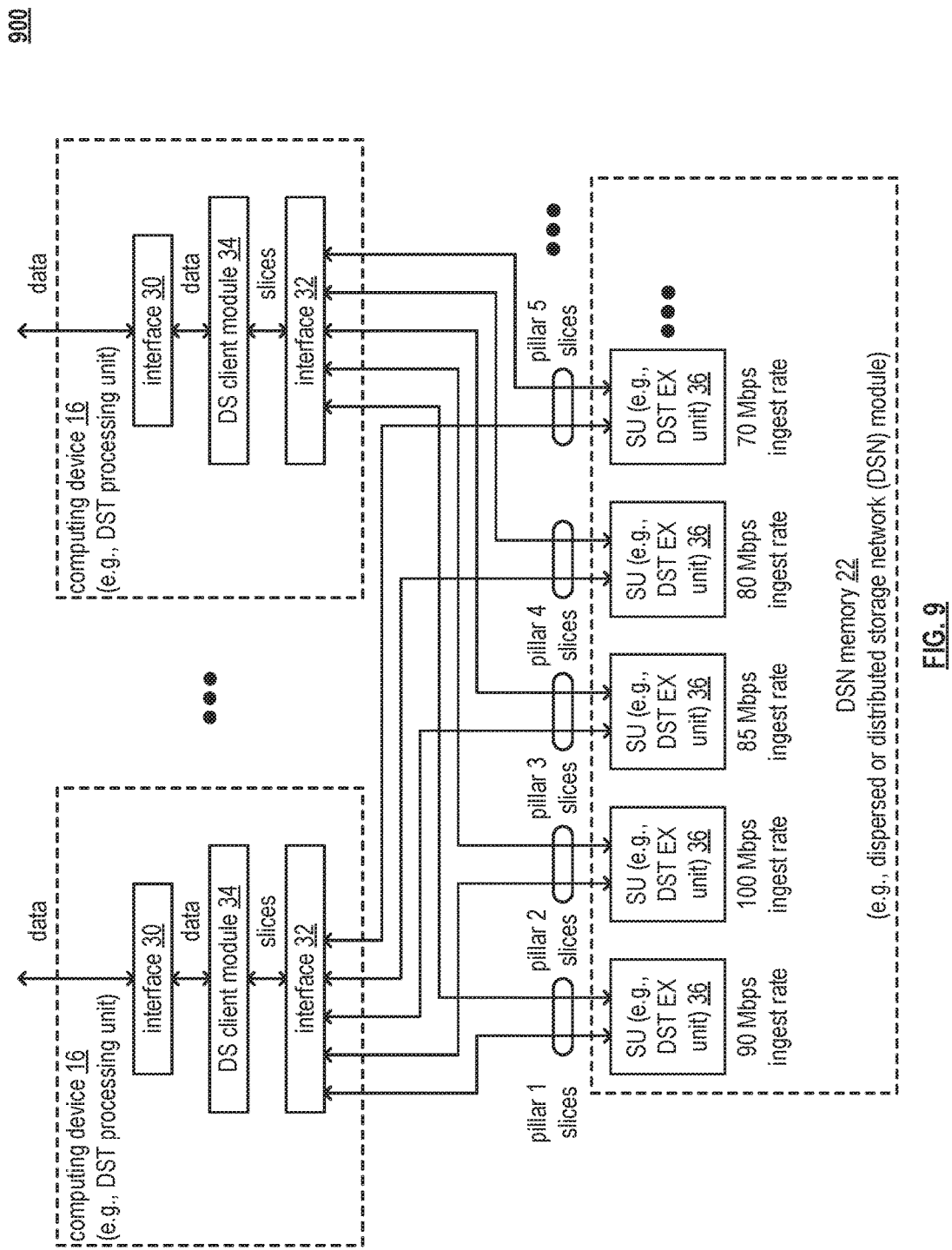
FIG. 9 is a schematic block diagram of another embodiment of a distributed computing system in accordance with the present invention.

FIG. 9 is a schematic block diagram of another embodiment of a distributed computing system that includes a plurality of computing devices 16 (e.g., that may alternatively be referred to as distributed storage and task (DST) processing units) and a DSN memory 22 (e.g., alternatively referred to as a dispersed or distributed storage network (DSN) module). Each computing device 16 of the plurality of computing devices 16 includes an interface 30, a DS client module 34, and an interface 32. The DSN memory 22 (e.g., alternatively SU module) includes a set of SUs 36 (e.g., alternatively, a set of DST execution units). For example, the DSN memory 22 includes five SUs 36 when a pillar width is five.

The system functions to store data as a plurality of sets of encoded data slices in the DSN memory 22. The data may be retrieved from the DSN memory 22 when at least a decode threshold number of encoded data slices per set of the plurality of sets of encoded data slices is available. A DS client module 34 receives the data via the interface 30 and encodes the data to produce the plurality of sets of encoded data slices for storage in at least a decode threshold number of SUs 36 of the set of SUs 36.

Each DS client module 34 of the plurality of computing devices 16 may simultaneously receive data, encode the data to produce slices, and send slices to the set of SUs 36 for storage therein. Each SU 36 may be associated with a unique slice ingest rate as compared to slice ingest rates of other SUs 36. Each DS client module 34 may determine a write threshold when storing data in the DSN memory 22 based on slice ingest rates of the set of SUs 36. The write threshold is greater than or equal to the decode threshold and less than or equal to the pillar width. For example, the DS client module 34 determines the write threshold to be 4 based on a current slice ingest rate of the set of SUs 36 when the decode threshold is 3 and the pillar width is 5. In such an example, the DS client module 34 sends 4 slices per set of the plurality of sets of encoded data slices to four of the SUs 36 for storage therein.

In an example of operation, the DS client module 34 of a first computing device 16 receives data via interface 30 and encodes the data to produce the plurality of sets of encoded data slices. The DS client module 34 determines the write threshold based on one or more of a reliability level goal, a speed threshold goal, an ingest rate of the data, a predetermination, a look up, a request, a query, a test, and input/output load placed on the set of SUs 36 by one or more other computing devices 16, and an ingest rate associated with each SU 36 of the set of SUs 36. For example, the DS client module 34 sends a first set of encoded data slices to the set of SUs 36 and monitors ingestion performance to determine the ingest rate capability associated with each SU 36. For instance, a first SU 36 ingests pillar 1 slices at a rate of 90 MB per second, a second SU 36 ingests pillar 2 slices at a rate of 100 MB per second, a third SU 36 ingests pillar 3 slices at a rate of 85 MB per second, a fourth SU 36 ingests pillar 4 slices at a rate of 80 MB per second, and a fifth SU 36 ingests pillar 5 slices at a rate of 70 MB per second. Next, the DS client module 34 selects the write threshold to be three and determines to utilize the first, the second, and the third SU 36 to ingest the read threshold number of encoded data slices per set of encoded data slices since those SUs 36 have a most favorable ingestion rate capability level.

As another example, DS client module 34 obtains input/output load information from other computing device 16 of the plurality of computing devices 16 to determine available access capacity of each SU 36. The method of operation of the DS client module 34 where this example is discussed in greater detail with reference to FIG. 11.

The DS client module 34 sends the write threshold number of encoded data slices per set of encoded data slices to a corresponding write threshold number of SUs 36 of the set of SUs 36. The DS client module 34 may facilitate rebuilding of other encoded data slices per set of encoded data slices, wherein the other encoded data slices were not written to corresponding SUs 36.

In an example of operation and implementation, a computing device includes an interface configured to interface and communicate with a dispersed or distributed storage network (DSN), a memory that stores operational instructions, and a processing module operably coupled to the interface and memory such that the processing module, when operable within the computing device based on the operational instructions, is configured to perform various operations.

For example, the computing device is configured to determine a plurality of data access rates corresponding respectively to a plurality of storage units (SUs) within the DSN. When a difference between a first slowest data access rate and a second slowest data access rate among the plurality of data access rates corresponding respectively to the plurality of SUs within the DSN compares favorably to a performance parameter, the computing device is configured to select at least a data access threshold number of SUs among the plurality of SUs that excludes a first slowest SU having the first slowest data access rate to service at least one data access request for at least one set of encoded data slices (EDSs) corresponding to a data object.

Note that the data object is segmented into a plurality of data segments, and a data segment of the plurality of data segments is dispersed error encoded in accordance with dispersed error encoding parameters to produce a set of encoded data slices (EDSs). Note also that a decode threshold number of EDSs are needed to recover the data segment, a read threshold number of EDSs provides for reconstruction of the data segment, and a write threshold number of EDSs provides for a successful transfer of the set of EDSs from a first at least one location in the DSN to a second at least one location in the DSN. Note also that the data access threshold number corresponds to the decode threshold number, the read threshold number, and/or the write threshold number.

The computing device also configured to facilitate servicing of the at least one data access request for the at least one set of EDSs corresponding to the data object by the at least a data access threshold number of SUs among the plurality of SUs that excludes the first slowest SU having the first slowest data access rate.

In some examples, the at least one data access request for the at least one set of EDSs corresponding to the data object corresponds to at least one write request for the at least one set of EDSs corresponding to the data object. For example, the computing device is configured to dispersed error encode (DSE) the data object to generate sets of EDSs that include the set of EDSs and to transmit a plurality of write requests to the plurality of SUs within the DSN. The computing device is also configured to determine a plurality of data ingest rates corresponding respectively to the plurality of SUs within the DSN based on the plurality of write requests.

When another difference between a first slowest data ingest rate and a second slowest data ingest rate among the plurality of data access rates corresponding respectively to the plurality of SUs within the DSN compares favorably to a data ingest rate performance parameter, the computing device is configured to select at least a write threshold number of SUs among the plurality of SUs that excludes the first slowest SU having the first slowest data ingest rate to service at least one write request for the at least one set of EDSs corresponding to the data object.

The computing device is also configured to determine a transmit data rate that compares favorably to a slowest data ingest rate among the at least a write threshold number of SUs among the plurality of SUs that excludes the first slowest SU having the first slowest data ingest rate. The computing device is also configured to transmit a write threshold number of write requests to the at least a write threshold number of SUs based on the transmit data rate to facilitate servicing of the at least one write request for the at least one set of EDSs corresponding to the data object.

In some other examples, the at least one data access request for the at least one set of EDSs corresponding to the data object corresponds to at least read request for the at least one set of EDSs corresponding to the data object. For example, the computing device is configured to transmit a plurality of read requests to the plurality of SUs within the DSN and to determine a plurality of data read rates corresponding respectively to the plurality of SUs within the DSN based on the plurality of read requests.

When another difference between a first slowest data read rate and a second slowest data read rate among the plurality of data access rates corresponding respectively to the plurality of SUs within the DSN compares favorably to a data read rate performance parameter, the computing device is configured to select at least a read threshold number of SUs among the plurality of SUs that excludes the first slowest SU having the first slowest data read rate to service at least read request for the at least one set of EDSs corresponding to the data object.

The computing device is also configured to determine a transmit data rate that compares favorably to a slowest data read rate among the at least a read threshold number of SUs among the plurality of SUs that excludes the first slowest SU having the first slowest data read rate. The computing device is also configured to transmit a read threshold number of read requests to the at least a read threshold number of SUs based on the transmit data rate to facilitate servicing of the at least read request for the at least one set of EDSs corresponding to the data object.

In even other examples, when the difference between the first slowest data access rate and the second slowest data access rate among the plurality of data access rates corresponding respectively to the plurality of SUs within the DSN compares unfavorably to the performance parameter and when another difference between the second slowest data access rate and a third slowest data access rate among the plurality of data access rates corresponding respectively to the plurality of SUs within the DSN compares favorably to the performance parameter, the computing device is also configured to select the at least a data access threshold number of SUs among the plurality of SUs that excludes the first slowest SU having the first slowest data access rate and a second slowest SU having the second slowest data access rate to service at least one data access request for the at least one set of EDSs corresponding to the data object. The computing device is also configured to facilitate servicing of the at least one data access request for the at least one set of EDSs corresponding to the data object by the at least a data access threshold number of SUs among the plurality of SUs that excludes the first slowest SU having the first slowest data access rate and the second slowest SU having the second slowest data access rate.

In yet other examples, the computing device is also configured to facilitate rebuilding of at least one remaining set of EDSs excluded from the servicing of the at least one data access request for the at least one set of EDSs corresponding to the data object by the at least a data access threshold number of SUs among the plurality of SUs that excludes the first slowest SU having the first slowest data access rate.

Note that the computing device may be located at a first premises that is remotely located from at least one SU of a plurality of SUs within the DSN. Also, note that the computing device may be of any of a variety of types of devices as described herein and/or their equivalents including a SU of any group and/or set of SUs within the DSN, a wireless smart phone, a laptop, a tablet, a personal computers (PC), a work station, and/or a video game device. Note also that the DSN may be implemented to include or be based on any of a number of different types of communication systems including a wireless communication system, a wire lined communication systems, a non-public intranet system, a public internet system, a local area network (LAN), and/or a wide area network (WAN).

Figure 10:
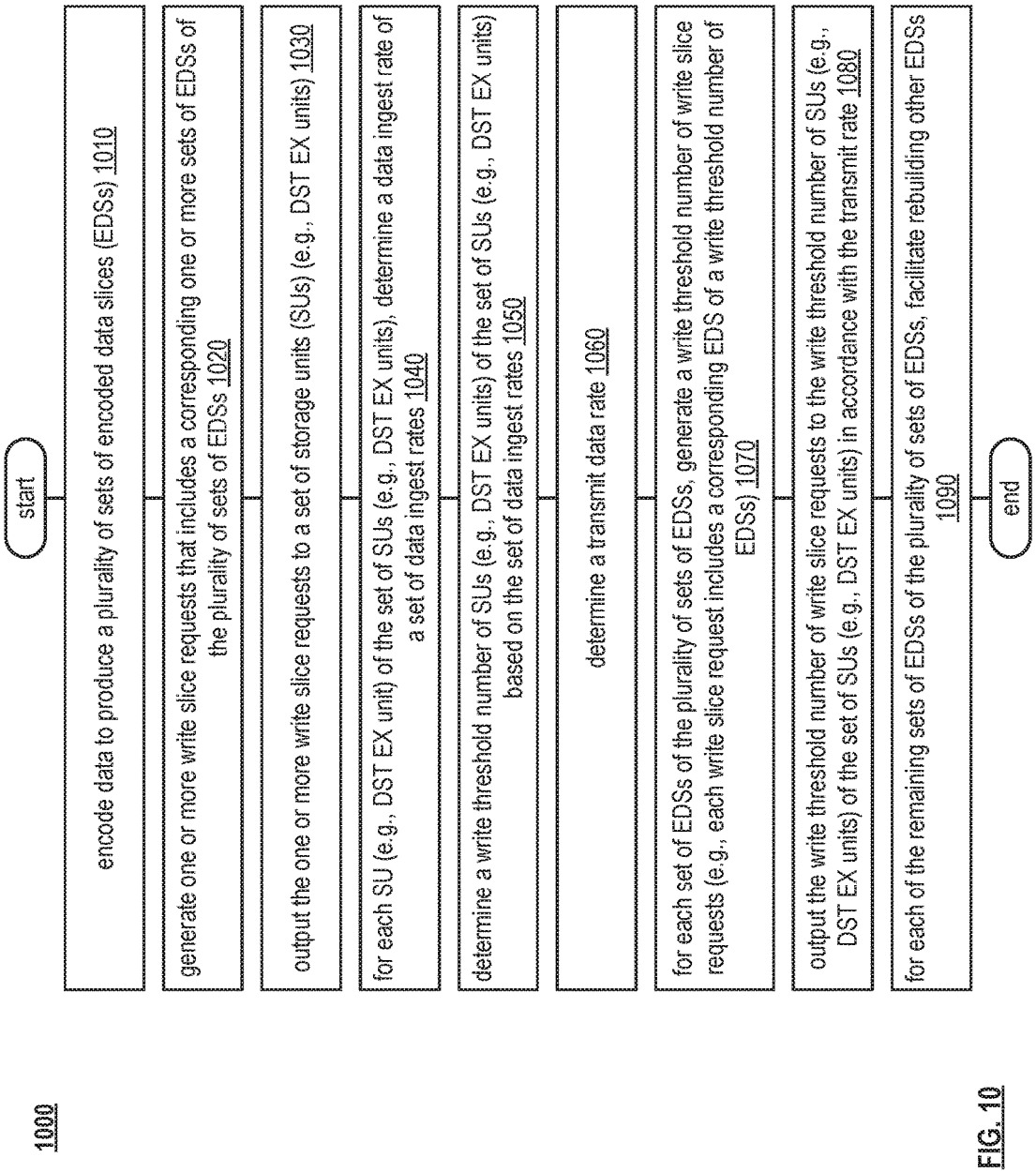
FIG. 10 is a flowchart illustrating an example of storing data in accordance with the present invention.

FIG. 10 is a flowchart illustrating an example of storing data. The method 1000 begins at the step 1010 where a processing module (e.g., of a distributed storage and task (DST) client module) encodes data to produce a plurality of sets of encoded data slices utilizing a dispersed storage error coding function. The method 1000 continues at the step 1020 where the processing module generates one or more sets of write slice requests that includes a corresponding one or more sets of encoded data slices of the plurality of sets of encoded data slices. The generating may include determining the number of the one or more sets of write slice requests based on at least one of a predetermination, a historic number to realize reliable ingest speed data, and a request. For example, the processing module determines to send five sets of encoded data slices when reliable ingest speed data has been historically obtained utilizing four sets of encoded data slices.

The method 1000 continues at the step 1030 where the processing module outputs the one more sets of write slice requests to a set of SUs. For each SU of a set of SUs, the method 1000 continues at the step 1040 where the processing module determines a data ingest rate of a set of data ingest rates. The determining may be based on one or more of a query, a speed test, a lookup, and receiving an error message.

The method 1000 continues at the step 1050 where the processing module determines at least a write threshold number of SUs of the set of SUs based on the set of data ingest rates. The determining may be further based on one or more of an estimated reliability level for data storage, a reliability level threshold, an estimated access speed, a lowest access speed of the at least a write threshold number of SUs, a speed threshold, an access capability estimator, a predetermination, an estimated rebuilding impact, a rebuilding impact threshold, and a lookup. For example, a processing module determines to utilize a first, a third, a fourth and a fifth SU of the set of SUs to realize the write threshold of four for a set of five SUs, when the first, the third, the fourth, and the fifth SU each have an estimated access speed greater than the speed threshold, and the estimated rebuilding impact compares favorably to the rebuilding impact threshold for rebuilding slices of a second SU of the set of SUs.

The method 1000 continues at step 1060 where the processing module determines a transmit data rate such that the transmit data rate compares favorably (e.g., greater than or equal to) to a lowest data ingest rate of the at least a write threshold number of SUs. For example, the processing module determines the transmit data rate to be 70 MB per second when the lowest data ingest rate of the at least a write threshold number of SUs is 70 MB per second.

For each remaining set of encoded data slices of the plurality of sets of encoded data slices, the method 1000 continues at the step 1070 where the processing module generates a write threshold number of write slice requests, wherein each request includes a corresponding encoded data slice of a write threshold number of encoded data slices. For example, the processing module generates write slice requests for pillars one, three, four, and five when SUs one, three, four, and five have been selected as part of the at least a write threshold number of SUs.

The method 1000 continues at the step 1080 where the processing module outputs the write threshold number of write slice requests to the at least a write threshold number of SUs of the set of SUs in accordance with the transmit data rate. For example, the processing module outputs slices to each of the at least a write threshold number of SUs at a rate of 70 MB per second when the transmit data rate is 70 MB per second. The for each of the remaining sets of encoded data slices of the plurality of sets of encoded data slices, the method 1000 continues at the step 1090 where the processing module facilitates rebuilding other encoded data slices (e.g., slices not written). The facilitating includes at least one of directly rebuilding, rebuilding in accordance with a schedule to achieve a loading goal, and sending a rebuilding request to a rebuilding module.

Figure 11:
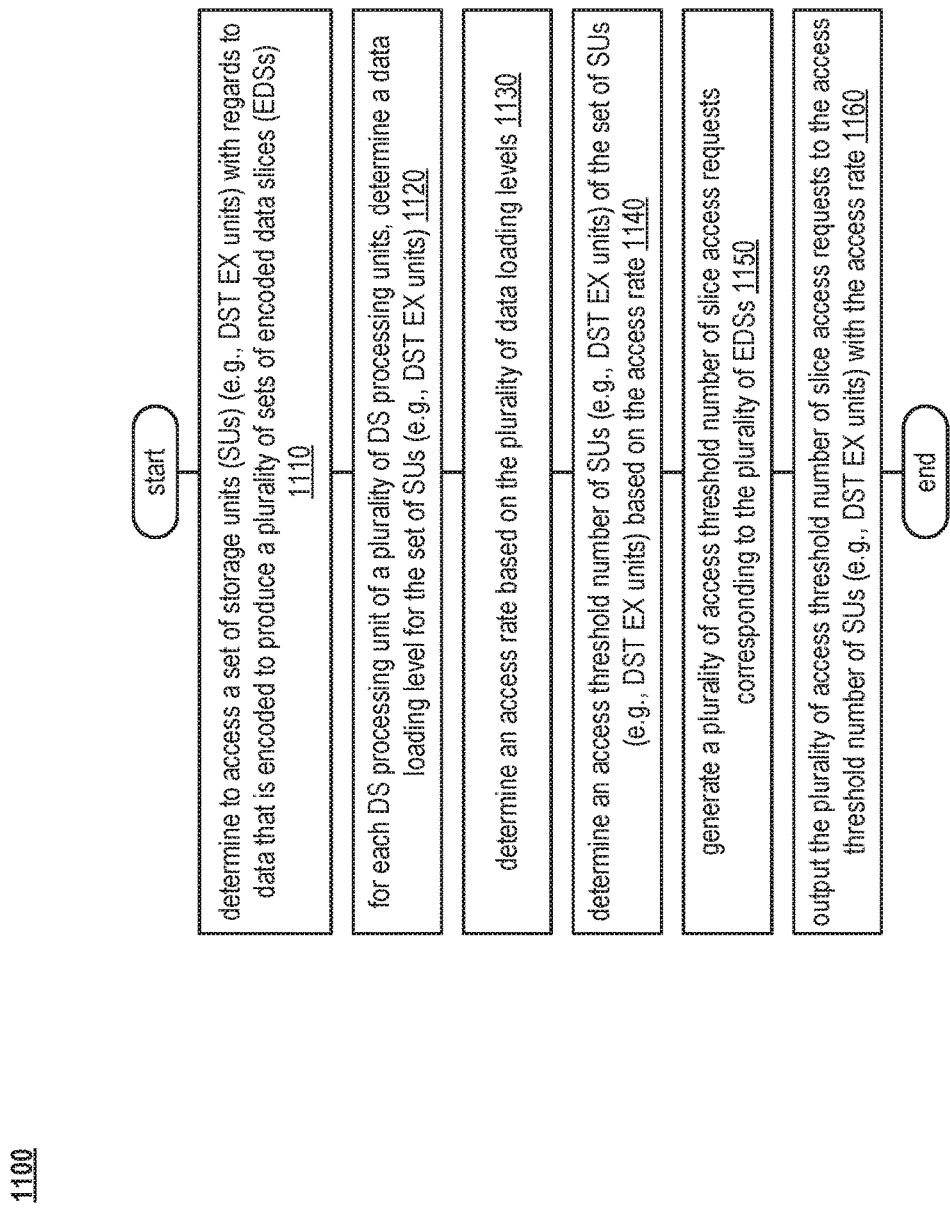
FIG. 11 is a flowchart illustrating another example of storing data in accordance with the present invention.

FIG. 11 is a flowchart illustrating another example of storing data. The method 1100 begins at the step 1110 where a processing module (e.g., of a distributed storage and task (DST) client module of a computing device) determines to access a set of SUs with regards to data that is encoded to produce a plurality of sets of encoded data slices. Accessing includes at least one of reading a slice and writing a slice. The determining may be based on one or more of receiving a retrieval request, receiving a rebuilding request, and receiving a storage request.

For each other computing device of a plurality of computing devices that includes the computing device, the method 1100 continues at the step 1120 where the processing module determines a data loading level for the set of SUs. The data loading level includes input and/or output loading metrics for access to each SU of the set of SUs with regards to the computing device. The determining may be based on one or more of a query, a test, monitoring loading levels, receiving a list, and receiving loading information as part of an access request. For example, the processing module queries for computing devices for a data loading level with regards to the set of SUs when the processing module determines that five computing devices are accessing the set of SUs, wherein the five computing devices includes the computing device.

The method 1100 continues at the step 1130 where the processing module determines an access rate based on the plurality of data loading levels. The processing module determines the access rate such that the access rate plus an aggregate of the plurality of data loading levels is less than an access capability level of the set of SUs. The method 1100 continues at the step 1140 where the processing module determines at least a data access threshold number of SUs of the set of SUs based on access rate. The determining includes identifying a loading level for each SU in determining the access threshold number by dividing the access rate by a lowest loading level of a set of loading levels.

The method 1100 continues at the step 1150 where the processing module generates a plurality of access threshold number of slice access requests corresponding to the plurality of encoded data slices. The method 1100 continues at step 1160 where the processing module outputs the plurality of access threshold number of slice access requests to the at least a data access threshold number of SUs in accordance with the access rate.

Figure 12:
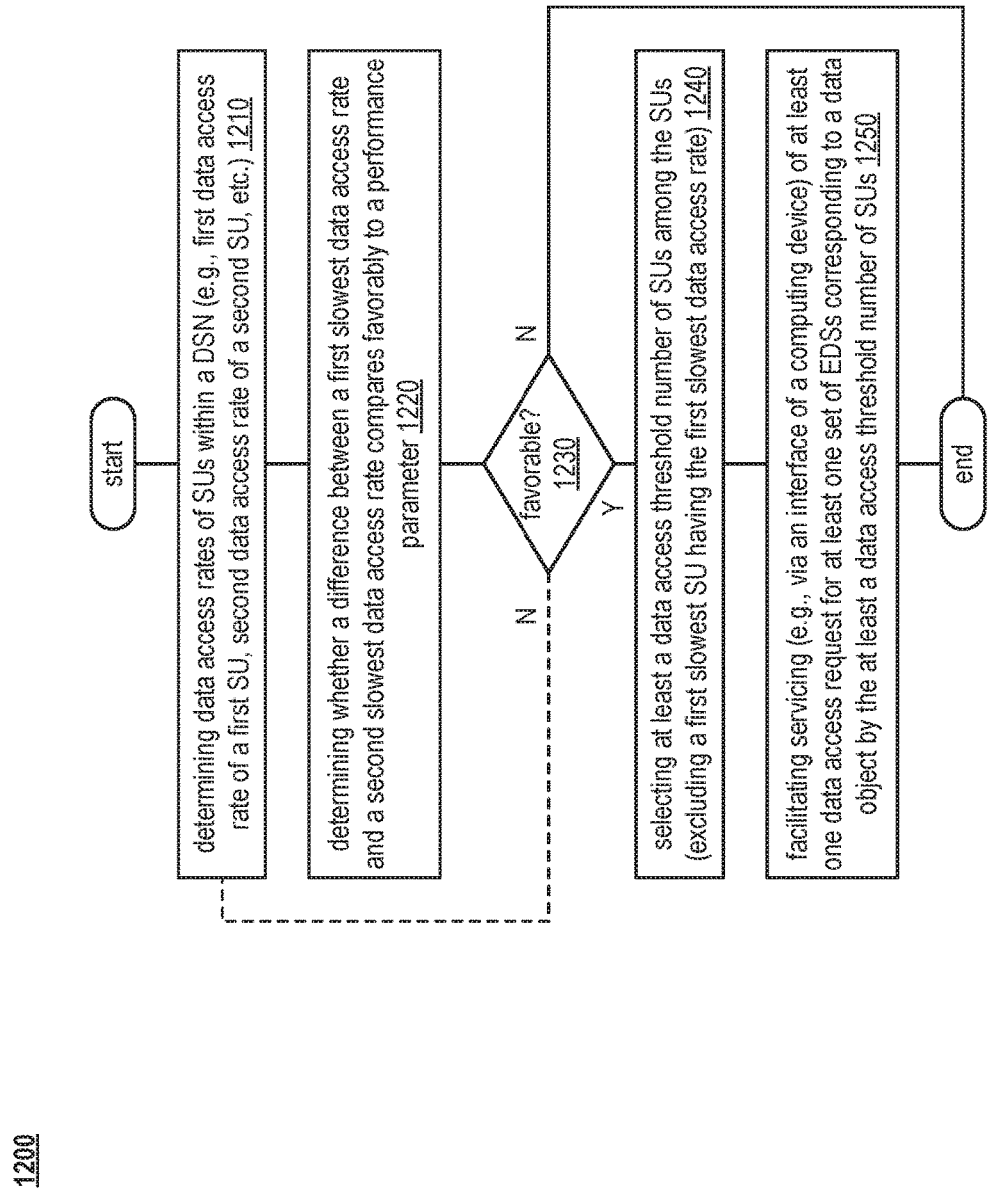
FIG. 12 is a diagram illustrating an embodiment of a method for execution by one or more computing devices in accordance with the present invention.

FIG. 12 is a diagram illustrating an embodiment of a method 1200 for execution by one or more computing devices in accordance with the present invention. The method 1200 begins in step 1210 by determining a plurality of data access rates corresponding respectively to a plurality of storage units (SUs) within a dispersed or distributed storage network (DSN).

Then, the method 1200 continues in step 1220 by determining whether a difference between a first slowest data access rate and a second slowest data access rate among the plurality of data access rates corresponding respectively to the plurality of SUs within the DSN compares favorably to a performance parameter.

An example of a performance parameter may be an acceptable degree of difference in operational speeds between SUs (e.g., an operational speed being a speed at which data access requests may be serviced by the SU, such as read request(s) and/or write request(s)). One example of a performance parameter is when a difference in operational speeds between a first SU and a second SU being 33% (e.g., the second SU capable to operate at an operational speed that is 33% faster than the first SU). Another example of a performance parameter is when a difference in operational speeds between a first SU and a second SU being 50% (e.g., the second SU capable to operate at an operational speed that is 50% faster than the first SU). Yet another example of a performance parameter is when a difference in operational speeds between a first SU and a second SU being 100% (e.g., the second SU capable to operate at an operational speed that is 100% faster, or twice as fast, than the first SU).

When the difference between the first slowest data access rate and the second slowest data access rate among the plurality of data access rates corresponding respectively to the plurality of SUs within the DSN compares unfavorably to the performance parameter (e.g., as determined in step 1230), then the method 1200 branches back to step 1210 or ends. For example, if the performance parameter is when a difference in operational speeds between a first SU and a second SU being 33% (e.g., the second SU capable to operate at an operational speed that is 33% faster than the first SU), then if the second SU is not 33% faster than the first SU, then the operation of step 1230 determines that there is unfavorably comparison to the performance parameter. In another example, if the performance parameter is when a difference in operational speeds between a first SU and a second SU being 33% (e.g., the second SU capable to operate at an operational speed that is 33% faster than the first SU), then if the second SU is in fact 33% faster than the first SU, then the operation of step 1230 determines that there is favorably comparison to the performance parameter.

Alternatively, when the difference between the first slowest data access rate and the second slowest data access rate among the plurality of data access rates corresponding respectively to the plurality of SUs within the DSN compares favorably to the performance parameter (e.g., as determined in step 1230), then the method 1200 branches to step 1240 by selecting at least a data access threshold number of SUs among the plurality of SUs that excludes a first slowest SU having the first slowest data access rate to service at least one data access request for at least one set of EDSs corresponding to the data object.

Note that the data object is segmented into a plurality of data segments, and a data segment of the plurality of data segments is dispersed error encoded in accordance with dispersed error encoding parameters to produce a set of encoded data slices (EDSs). Note also that a decode threshold number of EDSs are needed to recover the data segment, a read threshold number of EDSs provides for reconstruction of the data segment, and a write threshold number of EDSs provides for a successful transfer of the set of EDSs from a first at least one location in the DSN to a second at least one location in the DSN. Note also that the data access threshold number corresponds to the decode threshold number, the read threshold number, and/or the write threshold number.

Then, via an interface of the computing device that is configured to interface and communicate with the DSN, the method 1200 continues in step 1250 by facilitating servicing of the at least one data access request for the at least one set of EDSs corresponding to the data object by the at least a data access threshold number of SUs among the plurality of SUs that excludes the first slowest SU having the first slowest data access rate.

FIG. 13 is a diagram illustrating another embodiment of a method 1300 for execution by one or more computing devices in accordance with the present invention. The method 1300 begins in step 1310 by determining a plurality of data access rates corresponding respectively to a plurality of SUs within the DSN. Then, the method 1300 continues in step 1320 by determining whether a first difference between a first slowest data access rate and a second slowest data access rate among the plurality of data access rates corresponding respectively to the plurality of SUs within the DSN compares favorably to a performance parameter.

When the first difference between the first slowest data access rate and the second slowest data access rate among the plurality of data access rates corresponding respectively to the plurality of SUs within the DSN compares favorably to the performance parameter (e.g., as determined in step 1330), then the method 1300 ends (or alternatively can perform the steps 1240 and 1250 of method 1200 in FIG. 12).

Alternatively, when the first difference between the first slowest data access rate and the second slowest data access rate among the plurality of data access rates corresponding respectively to the plurality of SUs within the DSN compares favorably to the performance parameter (e.g., as determined in step 1330), then the method 1300 branches to step 1340 by determining whether a second difference between the second slowest data access rate and a third slowest data access rate among the plurality of data access rates corresponding respectively to the plurality of SUs within the DSN compares favorably to the performance parameter (or another performance parameter).

When the second difference between the second slowest data access rate and the third slowest data access rate among the plurality of data access rates corresponding respectively to the plurality of SUs within the DSN compares unfavorably to the performance parameter (or the other performance parameter) (e.g., as determined in step 1350), then the method 1300 branches back to step 1310 or ends.

Alternatively, when the second difference between the second slowest data access rate and the third slowest data access rate among the plurality of data access rates corresponding respectively to the plurality of SUs within the DSN compares favorably to the performance parameter (or the other performance parameter) (e.g., as determined in step 1350), then the method 1300 branches to step 1360 by selecting at least a data access threshold number of SUs among the plurality of SUs that excludes a first slowest SU having the first slowest data access rate and a second slowest SU having the second slowest data access rate to service at least one data access request for at least one set of encoded data slices (EDSs) corresponding to a data object.

For example, note that the difference between the data access rates of the first SU and the second SU may be minimal, yet the difference between the data access rates of the second SU and the third SU may be significant. As such, the difference between the data access rates of the second SU and the third SU may be such that selecting a subset of SUs that excludes the first slowest SU having the first slowest data access rate and the second slowest SU having the second slowest data access rate to ensure improved or optimal performance. From another perspective, there are two SUs that have data access rates that are significantly slower than data access rates of the other SUs and improvement of the DSN may be improved by selecting a subset of SUs that excludes the first slowest SU having the first slowest data access rate and the second slowest SU having the second slowest data access rate.

Note that the data object is segmented into a plurality of data segments, and a data segment of the plurality of data segments is dispersed error encoded in accordance with dispersed error encoding parameters to produce a set of EDSs. Note that a decode threshold number of EDSs are needed to recover the data segment, a read threshold number of EDSs provides for reconstruction of the data segment, and a write threshold number of EDSs provides for a successful transfer of the set of EDSs from a first at least one location in the DSN to a second at least one location in the DSN. Also, note that the data access threshold number corresponds to the decode threshold number, the read threshold number, and/or the write threshold number.

The method 1300 continues in step 1370 by facilitating servicing of the at least one data access request for the at least one set of EDSs corresponding to the data object by the at least a data access threshold number of SUs among the plurality of SUs that excludes the first slowest SU having the first slowest data access rate and the second slowest SU having the second slowest data access rate.

With respect to the operations as described with respect to the method 1300 in FIG. 13, note that comparisons made of performance (e.g., data access rates, data ingest rates, data read rates, etc.) between different respective SUs may continue to be performed for more than three respective SUs (e.g., between a first slowest SU, a second slowest SU, and a third slowest SU). For example, there may be a situation in which comparisons are made between and among X SUs (e.g., where X is the difference between the pillar width and a decode threshold, write threshold, or read threshold number).

For example, consider an example in which pillar width is 30 and write threshold is 25, then comparisons may be made to determine the difference between the data access rates (e.g., data ingest rates) between a first slowest SU, a second slowest SU, a third slowest SU, a fourth slowest SU, a fifth slowest SU, and a sixth slowest SU. In general, the operations may be made to consider dropping (e.g., not selecting) any one of the respective SUs. For example, in an instance in which comparisons of operation (e.g., data access rates such as data ingest rates in a write context) are made between a first slowest SU, a second slowest SU, a third slowest SU, a fourth slowest SU, a fifth slowest SU, and a sixth slowest SU, there may be instances in which any number of SUs up to the fifth slowest SU may be considered dropped (e.g., not selected). However, comparisons of operation (e.g., data access rates such as data ingest rates in a write context) between a sixth slowest SU and a seventh slowest SU need not be made because the sixth slowest SU will not be dropped because the number of SUs that may be dropped would not be such that fewer than the write threshold number (e.g., 25 in this example) would be operable (e.g., no fewer than 5 SUs may be considered to be dropped (e.g., not selected) being the difference between the pillar width of 30 and write threshold of 25).

Again, the operations as described herein may be adapted and applicable to more than three respective SUs (e.g., between a first slowest SU, a second slowest SU, and a third slowest SU). Also, with respect to operations as described with respect to the method 1300 in FIG. 13, note the first slowest SU having the first slowest data access rate may not be the absolutely slowest SU among the plurality of SUs in some cases. For example, such operations as described with respect to the method 1300 in FIG. 13 may be applied to any group of three SUs among the number of SUs that is the pillar width and the data access threshold (e.g., the write threshold in the write context).

Moreover, note that when a decision is made to drop (e.g., not select) an SU in certain instances may affect another decision to drop (e.g., not select) another SU. As an example with respect to a write implementation (e.g., data ingest), when an SU is dropped (e.g., not selected) and encoded data slices (EDSs) are not sent to that SU that has been dropped (e.g., not selected), there can be a future rebuild cost associated with rebuilding EDSs that were not sent. In other words, once a SU is dropped (e.g., not selected) and EDSs are not sent to that SU, then there has already been paid a rebuild cost. The incremental cost of potentially dropping (e.g., not selecting) another SU (e.g., up to the difference between the pillar width and write threshold) may be relatively much less. In some examples, the majority of the expense is paid per segment with having a dropped EDS regardless of the number of dropped EDSs (e.g., again, up to the difference between the pillar width and write threshold). Then, a write threshold number of slices will be rebuilt regardless of the missing number of EDSs. As such, a favorability metric/cost-function that directs whether to drop additional EDS(s) may be adapted/adjusted (e.g., a lowered) threshold when to determine whether to drop additional EDS(s)) after a first EDS has been dropped. For example, when a first EDS has been decided to be dropped, then the decision to drop a second (or up to a third, etc.) EDS may be more easily favorable based on an adapted/adjusted (e.g., a lowered) metric/cost-function since the majority of the expense is already paid.

Also, in some examples, the method 1300 also operates by facilitating rebuilding of at least one remaining set of EDSs excluded from the servicing of the at least one data access request for the at least one set of EDSs corresponding to the data object by the at least a data access threshold number of SUs among the plurality of SUs that excludes the first slowest SU having the first slowest data access rate.

This disclosure presents, among other things, various examples of operations that may be performed by an appropriately configured computing device. One example includes a computing device (e.g., a DS processing unit) writes a set of slices of error coded data. Due to disparities in capability and utilization of the various SUs (e.g., DS units) and/or network links they use, some SUs fall behind the others in regards to the processing of the received slices. The computing device may then make a decision to either operate at the speed of the slowest SU or SUs, or to forgo sending slices to all SUs. Slices not written at the time of the write will need to be rebuilt, and thus the decision to drop slices can only be done if a threshold number has been successfully written to a threshold (e.g., an information dispersal algorithm (IDA) threshold, write threshold, or other threshold) of SUs. Rebuilding slices imposes a cost of future network SU resources, so the computing device weighs the advantages of writing at the slower rate and not needing to rebuild, vs. writing at a faster rate to some sub-set of the SUs and rebuilding later.

In one instance, a computing device may be configured to optimize performance above other concerns such as reliability. In such a case, the computing device will order the set of SUs being written to by their performance level (e.g., ingestion rate), then the computing device will consider the disparity in performance between the slowest store and the 2nd slowest store. If the slowest store were, for example, 75% of the speed of the 2nd slowest store, then by dropping the slices to the slowest store, performance could increase by (1/0.75) 1.333. However, the cost of rebuilding the one lost slice will result in up to an additional (Threshold/Width)* (Improved Write Rate) level of bandwidth being used by rebuilding, which for most instances where T is close to W, is almost a doubling of the amount of bandwidth used and a halving of the performance. Therefore, the computing device may not consider dropping this one slice to be beneficial. However, the computing device can reconsider this question for each different grouping of slowest stores. For example, if the 2nd slowest store in this example is 1/10th the speed of the 3rd slowest store, then performance could be improved by 10× by forgoing writing slices for the 1st and 2nd slowest store. The computing device can determine for each pair of slowest stores, up to the write-threshold-th slowest store. Note that operation in certain examples is such that the operations do not drop so many slices as to go below the write threshold.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
   an interface configured to interface and communicate with a dispersed or distributed storage network (DSN);
   memory that stores operational instructions; and
   a processing module operably coupled to the interface and to the memory, wherein the processing module, when operable within the computing device based on the operational instructions, is configured to:
   determine a plurality of data access rates corresponding respectively to a plurality of storage units (SUs) within the DSN;
   when a difference between a first slowest data access rate and a second slowest data access rate among the plurality of data access rates corresponding respectively to the plurality of SUs within the DSN compares favorably to a performance parameter as being greater than or equal to the performance parameter, select at least a data access threshold number of SUs among the plurality of SUs that excludes a first slowest SU having the first slowest data access rate to service at least one data access request for at least one set of encoded data slices (EDSs) corresponding to a data object, wherein the data object is segmented into a plurality of data segments, wherein a data segment of the plurality of data segments is dispersed error encoded in accordance with dispersed error encoding parameters to produce a set of encoded data slices (EDSs), wherein a decode threshold number of EDSs are needed to recover the data segment, wherein a read threshold number of EDSs provides for reconstruction of the data segment, wherein a write threshold number of EDSs provides for a successful transfer of the set of EDSs from a first at least one location in the DSN to a second at least one location in the DSN, and wherein the data access threshold number corresponds to at least one of the decode threshold number, the read threshold number, or the write threshold number; and
   facilitate servicing of the at least one data access request for the at least one set of EDSs corresponding to the data object by the at least a data access threshold number of SUs among the plurality of SUs that excludes the first slowest SU having the first slowest data access rate.

2. The computing device of claim 1, wherein the processing module, when operable within the computing device based on the operational instructions, is further configured to:
   dispersed error encode (DSE) the data object to generate sets of EDSs that include the set of EDSs;
   transmit a plurality of write requests to the plurality of SUs within the DSN;
   determine a plurality of data ingest rates corresponding respectively to the plurality of SUs within the DSN based on the plurality of write requests;
   when another difference between a first slowest data ingest rate and a second slowest data ingest rate among the plurality of data access rates corresponding respectively to the plurality of SUs within the DSN compares favorably to a data ingest rate performance parameter as being greater than or equal to the data ingest rate performance parameter, select at least a write threshold number of SUs among the plurality of SUs that excludes the first slowest SU having the first slowest data ingest rate to service at least one write request for the at least one set of EDSs corresponding to the data object;
   determine a transmit data rate that compares favorably to a slowest data ingest rate as being no faster than the slowest data ingest rate among the write threshold number of SUs among the plurality of SUs that excludes the first slowest SU having the first slowest data ingest rate; and
   transmit at least a write threshold number of write requests to the at least a write threshold number of SUs based on the transmit data rate to facilitate servicing of the at least one write request for the at least one set of EDSs corresponding to the data object.

3. The computing device of claim 1, wherein the processing module, when operable within the computing device based on the operational instructions, is further configured to:
   transmit a plurality of read requests to the plurality of SUs within the DSN;
   determine a plurality of data read rates corresponding respectively to the plurality of SUs within the DSN based on the plurality of read requests;
   when another difference between a first slowest data read rate and a second slowest data read rate among the plurality of data access rates corresponding respectively to the plurality of SUs within the DSN compares favorably to a data read rate performance parameter as being greater than or equal to the data read rate performance parameter, select at least a read threshold number of SUs among the plurality of SUs that excludes the first slowest SU having the first slowest data read rate to service at least read request for the at least one set of EDSs corresponding to the data object;
determine a transmit data rate that compares favorably to a slowest data read rate as being no faster than the slowest data read rate among the at least a read threshold number of SUs among the plurality of SUs that excludes the first slowest SU having the first slowest data read rate; and
transmit at least a read threshold number of read requests to the at least a read threshold number of SUs based on the transmit data rate to facilitate servicing of the at least read request for the at least one set of EDSs corresponding to the data object.

4. The computing device of claim 1, wherein the processing module, when operable within the computing device based on the operational instructions, is further configured to:
when the difference between the first slowest data access rate and the second slowest data access rate among the plurality of data access rates corresponding respectively to the plurality of SUs within the DSN compares unfavorably to the performance parameter as being less than the performance parameter, and when another difference between the second slowest data access rate and a third slowest data access rate among the plurality of data access rates corresponding respectively to the plurality of SUs within the DSN compares favorably to the performance parameter as being greater than or equal to the performance parameter, select the at least a data access threshold number of SUs among the plurality of SUs that excludes the first slowest SU having the first slowest data access rate and a second slowest SU having the second slowest data access rate to service at least one data access request for the at least one set of EDSs corresponding to the data object; and
facilitate servicing of the at least one data access request for the at least one set of EDSs corresponding to the data object by the at least a data access threshold number of SUs among the plurality of SUs that excludes the first slowest SU having the first slowest data access rate and the second slowest SU having the second slowest data access rate.

5. The computing device of claim 1, wherein the processing module, when operable within the computing device based on the operational instructions, is further configured to:
facilitate rebuilding of at least one remaining set of EDSs excluded from the servicing of the at least one data access request for the at least one set of EDSs corresponding to the data object by the at least a data access threshold number of SUs among the plurality of SUs that excludes the first slowest SU having the first slowest data access rate.

6. The computing device of claim 1, wherein the computing device is located at a first premises that is remotely located from at least one SU of the plurality of SUs within the DSN.

7. The computing device of claim 1 further comprising:
a SU of the plurality of SUs within the DSN, a wireless smart phone, a laptop, a tablet, a personal computers (PC), a work station, or a video game device.

8. The computing device of claim 1, wherein the DSN includes at least one of a wireless communication system, a wire lined communication systems, a non-public intranet system, a public internet system, a local area network (LAN), or a wide area network (WAN).

9. A computing device comprising:
an interface configured to interface and communicate with a dispersed or distributed storage network (DSN);
memory that stores operational instructions; and
a processing module operably coupled to the interface and to the memory, wherein the processing module, when operable within the computing device based on the operational instructions, is configured to:
determine a plurality of data access rates corresponding respectively to a plurality of storage units (SUs) within the DSN;
when a first difference between a first slowest data access rate and a second slowest data access rate among the plurality of data access rates corresponding respectively to the plurality of SUs within the DSN compares unfavorably to a performance parameter as being less than the performance parameter and when a second difference between the first slowest data access rate and a third slowest data access rate among the plurality of data access rates corresponding respectively to the plurality of SUs within the DSN compares favorably to the performance parameter as being greater than or equal to the performance parameter, select at least a data access threshold number of SUs among the plurality of SUs that excludes a first slowest SU having the first slowest data access rate and a second slowest SU having the second slowest data access rate to service at least one data access request for at least one set of encoded data slices (EDSs) corresponding to a data object, wherein the data object is segmented into a plurality of data segments, wherein a data segment of the plurality of data segments is dispersed error encoded in accordance with dispersed error encoding parameters to produce a set of encoded data slices (EDSs), wherein a decode threshold number of EDSs are needed to recover the data segment, wherein a read threshold number of EDSs provides for reconstruction of the data segment, wherein a write threshold number of EDSs provides for a successful transfer of the set of EDSs from a first at least one location in the DSN to a second at least one location in the DSN, and wherein the data access threshold number corresponds to at least one of the decode threshold number, the read threshold number, or the write threshold number;
facilitate servicing of the at least one data access request for the at least one set of EDSs corresponding to the data object by the at least a data access threshold number of SUs among the plurality of SUs that excludes the first slowest SU having the first slowest data access rate and the second slowest SU having the second slowest data access rate; and
facilitate rebuilding of at least one remaining set of EDSs excluded from the servicing of the at least one data access request for the at least one set of EDSs corresponding to the data object by the at least a data access threshold number of SUs among the plurality of SUs that excludes the first slowest SU having the first slowest data access rate.

10. The computing device of claim 9, wherein the processing module, when operable within the computing device based on the operational instructions, is further configured to:
dispersed error encode (DSE) the data object to generate sets of EDSs that include the set of EDSs;
transmit a plurality of write requests to the plurality of SUs within the DSN;

determine a plurality of data ingest rates corresponding respectively to the plurality of SUs within the DSN based on the plurality of write requests;

when a third difference between a first slowest data ingest rate and a second slowest data ingest rate among the plurality of data ingest rates corresponding respectively to the plurality of SUs within the DSN compares unfavorably to a data ingest rate performance parameter as being less than the data ingest rate performance parameter and when a fourth difference between the first slowest data ingest rate and a third slowest data ingest rate among the plurality of data access rates corresponding respectively to the plurality of SUs within the DSN compares favorably to the data ingest rate performance parameter as being greater than or equal to the data ingest rate performance parameter, select at least a write threshold number of SUs among the plurality of SUs that excludes the first slowest SU having the first slowest data ingest rate and a second slowest SU having the second slowest data ingest rate to service at least one write request for the at least one set of EDSs corresponding to the data object;

determine a transmit data rate that compares favorably to a slowest data ingest rate as being no faster than the slowest data ingest rate among the at least a write threshold number of SUs among the plurality of SUs that excludes the first slowest SU having the first slowest data ingest rate; and transmit at least a write threshold number of write requests to the at least a write threshold number of SUs based on the transmit data rate to facilitate servicing of the at least one write request for the at least one set of EDSs corresponding to the data object.

11. The computing device of claim 9, wherein the processing module, when operable within the computing device based on the operational instructions, is further configured to:

transmit a plurality of read requests to the plurality of SUs within the DSN;

determine a plurality of data read rates corresponding respectively to the plurality of SUs within the DSN based on the plurality of read requests;

when a third difference between a first slowest data read rate and a second slowest data read rate among the plurality of data read rate corresponding respectively to the plurality of SUs within the DSN compares unfavorably to a data read rate performance parameter as being less than the data read rate performance parameter, and when a fourth difference between the first slowest data read rate and a third slowest data read rate among the plurality of data access rates corresponding respectively to the plurality of SUs within the DSN compares favorably to the data read rate performance parameter as being greater than or equal to the data read rate performance parameter, select at least a read threshold number of SUs among the plurality of SUs that excludes the first slowest SU having the first slowest data read rate and a second slowest SU having the second slowest data read rate to service at least one read request for the at least one set of EDSs corresponding to the data object;

determine a transmit data rate that compares favorably to a slowest data read rate as being no faster than the slowest data read rate among the at least a read threshold number of SUs among the plurality of SUs that excludes the first slowest SU having the first slowest data read rate; and transmit at least a read threshold number of read requests to the at least a read threshold number of SUs based on the transmit data rate to facilitate servicing of the at least one read request for the at least one set of EDSs corresponding to the data object.

12. The computing device of claim 9 further comprising: a SU of the plurality of SUs within the DSN, a wireless smart phone, a laptop, a tablet, a personal computers (PC), a work station, or a video game device.

13. The computing device of claim 9, wherein the DSN includes at least one of a wireless communication system, a wire lined communication systems, a non-public intranet system, a public internet system, a local area network (LAN), or a wide area network (WAN).

14. A method for execution by a computing device, the method comprising:

determining a plurality of data access rates corresponding respectively to a plurality of storage units (SUs) within a dispersed or distributed storage network (DSN);

when a difference between a first slowest data access rate and a second slowest data access rate among the plurality of data access rates corresponding respectively to the plurality of SUs within the DSN compares favorably to a performance parameter as being greater than or equal to the performance parameter, selecting at least a data access threshold number of SUs among the plurality of SUs that excludes a first slowest SU having the first slowest data access rate to service at least one data access request for at least one set of encoded data slices (EDSs) corresponding to a data object, wherein the data object is segmented into a plurality of data segments, wherein a data segment of the plurality of data segments is dispersed error encoded in accordance with dispersed error encoding parameters to produce a set of encoded data slices (EDSs), wherein a decode threshold number of EDSs are needed to recover the data segment, wherein a read threshold number of EDSs provides for reconstruction of the data segment, wherein a write threshold number of EDSs provides for a successful transfer of the set of EDSs from a first at least one location in the DSN to a second at least one location in the DSN, and wherein the data access threshold number corresponds to at least one of the decode threshold number, the read threshold number, or the write threshold number; and via an interface of the computing device that is configured to interface and communicate with the DSN, facilitating servicing of the at least one data access request for the at least one set of EDSs corresponding to the data object by the at least a data access threshold number of SUs among the plurality of SUs that excludes the first slowest SU having the first slowest data access rate.

15. The method of claim 14 further comprising:

dispersed error encoding the data object to generate sets of EDSs that include the set of EDSs;

transmitting, via the interface, a plurality of write requests to the plurality of SUs within the DSN;

determining a plurality of data ingest rates corresponding respectively to the plurality of SUs within the DSN based on the plurality of write requests;

when another difference between a first slowest data ingest rate and a second slowest data ingest rate among the plurality of data access rates corresponding respectively to the plurality of SUs within the DSN compares favorably to a data ingest rate performance parameter as being greater than or equal to the data ingest rate performance parameter, selecting at least a write threshold number of SUs among the plurality of SUs that excludes the first slowest SU having the first slowest data ingest rate to service at least one write request for the at least one set of EDSs corresponding to the data object;

determining a transmit data rate that compares favorably to a slowest data ingest rate as being no faster than the slowest data ingest rate among the at least a write threshold number of SUs among the plurality of SUs that excludes the first slowest SU having the first slowest data ingest rate; and transmitting, via the interface, at least a write threshold number of write requests to the at least a write threshold number of SUs based on the transmit data rate to facilitate servicing of the at least one write request for the at least one set of EDSs corresponding to the data object.

16. The method of claim 14 further comprising:

transmitting, via the interface, a plurality of read requests to the plurality of SUs within the DSN;

determining a plurality of data read rates corresponding respectively to the plurality of SUs within the DSN based on the plurality of read requests;

when another difference between a first slowest data read rate and a second slowest data read rate among the plurality of data access rates corresponding respectively to the plurality of SUs within the DSN compares favorably to a data read rate performance parameter as being greater than or equal to the data read rate performance parameter, selecting at least a read threshold number of SUs among the plurality of SUs that excludes the first slowest SU having the first slowest data read rate to service at least read request for the at least one set of EDSs corresponding to the data object;

determining a transmit data rate that compares favorably to a slowest data read rate as being no faster than the slowest data read rate among the at least a read threshold number of SUs among the plurality of SUs that excludes the first slowest SU having the first slowest data read rate; and transmitting, via the interface, at least a read threshold number of read requests to the at least a read threshold number of SUs based on the transmit data rate to facilitate servicing of the at least read request for the at least one set of EDSs corresponding to the data object.

17. The method of claim 14 further comprising:

when the difference between the first slowest data access rate and the second slowest data access rate among the plurality of data access rates corresponding respectively to the plurality of SUs within the DSN compares unfavorably to the performance parameter as being less than the performance parameter, and when another difference between the second slowest data access rate and a third slowest data access rate among the plurality of data access rates corresponding respectively to the plurality of SUs within the DSN compares favorably to the performance parameter as being greater than or equal to the performance parameter, selecting the at least a data access threshold number of SUs among the plurality of SUs that excludes the first slowest SU having the first slowest data access rate and a second slowest SU having the second slowest data access rate to service at least one data access request for the at least one set of EDSs corresponding to the data object; and facilitating servicing of the at least one data access request for the at least one set of EDSs corresponding to the data object by the at least a data access threshold number of SUs among the plurality of SUs that excludes the first slowest SU having the first slowest data access rate and the second slowest SU having the second slowest data access rate.

18. The method of claim 14 further comprising:

via the interface of the computing device, facilitating rebuilding of at least one remaining set of EDSs excluded from the servicing of the at least one data access request for the at least one set of EDSs corresponding to the data object by the at least a data access threshold number of SUs among the plurality of SUs that excludes the first slowest SU having the first slowest data access rate.

19. The method of claim 14, wherein the computing device includes a SU of the plurality of SUs within the DSN, a wireless smart phone, a laptop, a tablet, a personal computers (PC), a work station, or a video game device.

20. The method of claim 14, wherein the DSN includes at least one of a wireless communication system, a wire lined communication systems, a non-public intranet system, a public internet system, a local area network (LAN), or a wide area network (WAN).

* * * * *